June 25, 1957 J. F. GILBERT 2,796,957
PARKING BRAKE CONTROL FOR AUTOMOTIVE VEHICLES
Filed Nov. 19, 1954 2 Sheets-Sheet 1
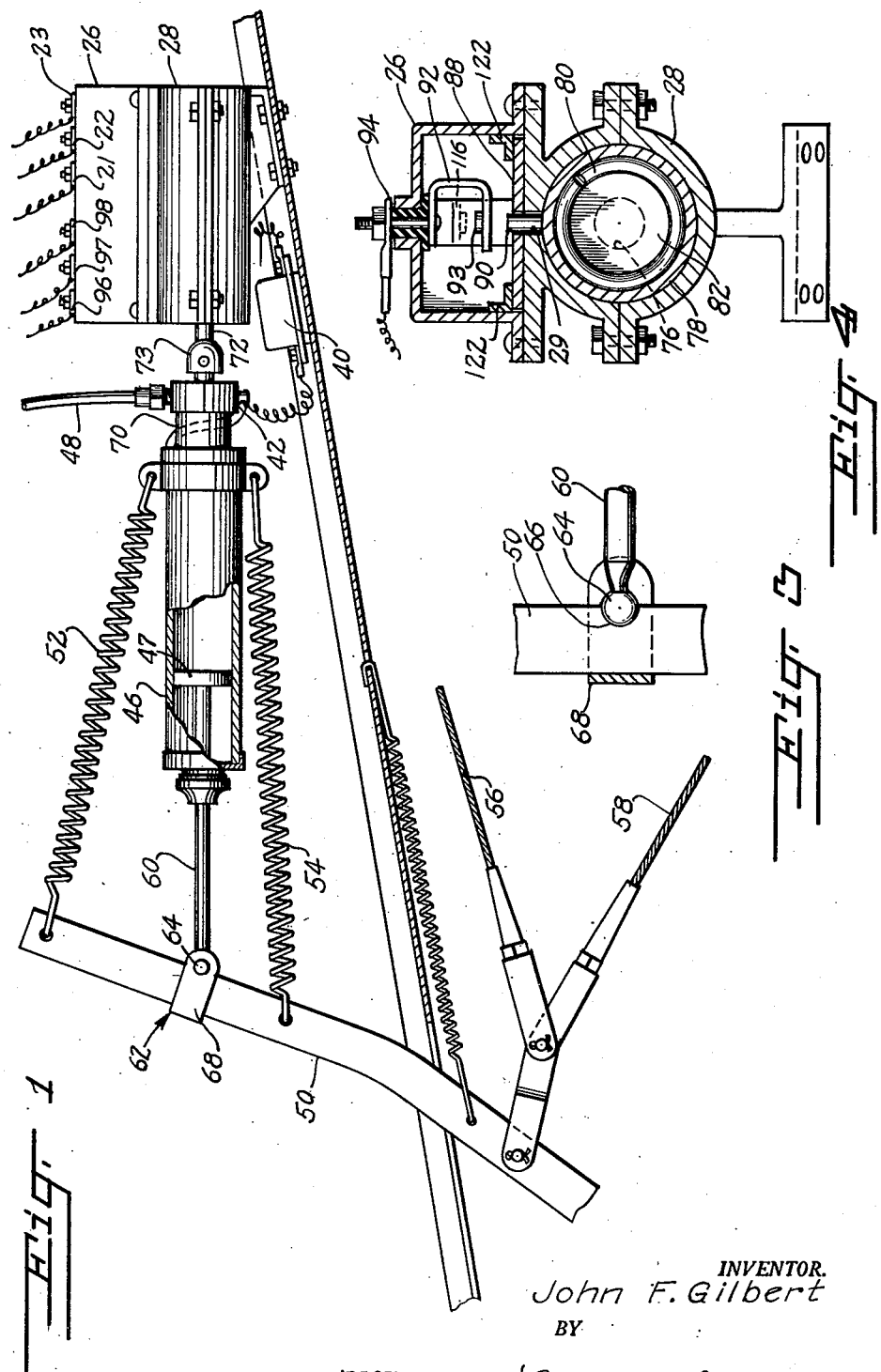
INVENTOR.
John F. Gilbert
BY
McMorrow, Berman & Davidson
ATTORNEYS

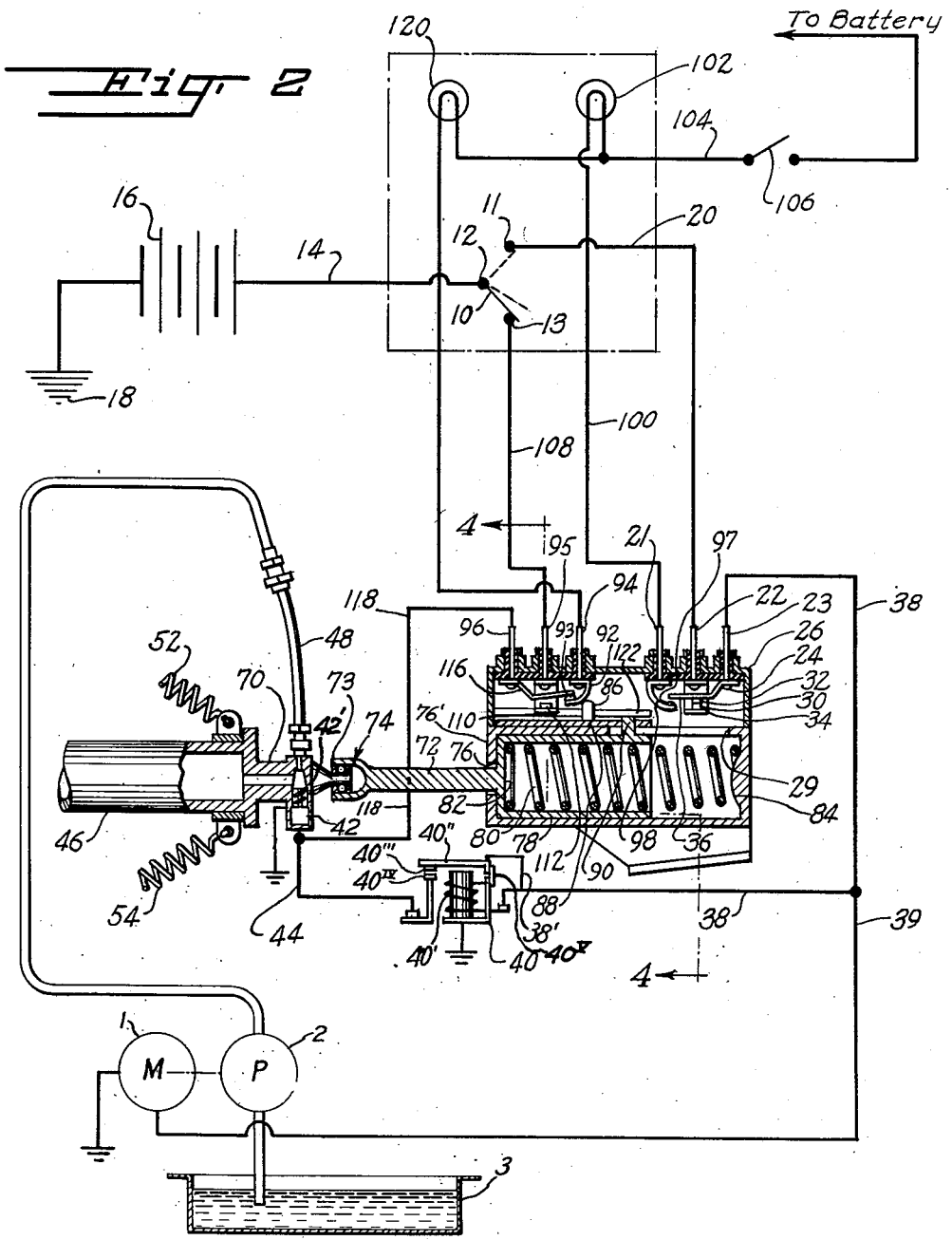

United States Patent Office 2,796,957
Patented June 25, 1957

2,796,957

PARKING BRAKE CONTROL FOR AUTOMOTIVE VEHICLES

John F. Gilbert, Hazard, Ky.

Application November 19, 1954, Serial No. 469,952

2 Claims. (Cl. 188—152)

This invention relates to brake controls and more particularly to a power operated parking brake control for automotive vehicles.

It is an object of this invention to provide a power operated parking brake control system for automotive vehicles which are preferably equipped with an electric-hydraulic power system for the operation of the tops, window lifts, seats, etc., which will automatically and uniformly apply the parking brake of the motor vehicle without effort on the part of the vehicle operator, and which will provide a greater degree of safety in the application of the parking brake by eliminating the variation in the degree of pull exerted by the operator upon the conventional type of parking brake lever.

It is a further object of this invention to provide a power operated parking brake control system wherein the operator will be given visual indication as to whether the parking brake is applied or has been released.

Another and further object of this invention is to provide in a power operated parking brake control, a system which includes readily available parts therefor which are operatively connected together in a simple yet effective manner to produce an automatic and uniform application and release of the parking brakes, and which will require a minimum of maintenance over an extended period of time.

Other objects and advantages will become apparent from a consideration of the following detailed description, forming the specification, and taken in conjunction with the accompanying drawings, in which:

Figure 1 is a side elevational view of the parking brake applying means embodying this invention;

Figure 2 is a diagrammatic view of the electrical circuit of the present parking brake control with the compensator being shown in section;

Figure 3 is a view, partially in section, of the connection between the parking brake actuating lever and the rod of a hydraulic piston forming a part of the brake control; and Figure 4 is a vertical, transverse cross sectional view taken substantially along line 4—4 of Figure 2 and looking in the direction of the arrows.

With continued reference to the drawings, there is shown a two position-three terminal, toggle type control switch which is adapted to be mounted within the driver's compartment of an automotive vehicle at a convenient location and which includes a pair of stationary contacts or terminals 11 and 13 and a movable contactor 10 shiftable to contact either of the stationary contacts 11 and 13.

The terminal 12 of the control switch is energized at all times through a wire 14 extending between the terminal 12 and the source of electrical energy, such as the battery 16 normally found in an automotive vehicle, with the battery 16 being grounded in the usual manner as at 18.

To apply the parking brake, the movable contactor 10 of the control switch is moved so as to make contact between the terminal 12 and the terminal 11 of the switch. Current will then flow through the wire 20 to the terminal 22 on the compensator switch generally indicated at 24 carried adjacent one end of a compensator switch housing 26 carried on the compensator cylinder 28.

The compensator switch 24 has three terminals, including the terminal 22, which are electrically insulated one from the other, the other two terminals being indicated at 21 and 23 respectively and disposed to opposite sides of the terminal 22.

Terminals 22 and 23 may be electrically connected through contact points 30 and 32, with the contact point 30 being carried upon a bracket 34 of electrically conductive material secured to the terminal 22, while the contact point 32 is carried by a resilient contact arm 36 of spring metal which is connected to the terminal 23. This will permit the flow of current to pass from terminal 22 to the terminal 23 through the engaged contact points 30 and 32 since the inherent resilience of the contact arm 36 will normally urge the contact point 32 into engagement with the contact point 30.

A flow of current then continues through a wire 38 connected at one end to the terminal 23 and at the other end to the coil 40' of a cutout relay 40, the flow of current also continuing through the branch wire 38' connected at one end to the wire 38 and the cutout coil 40' and at the other end to the movable contact member 40". With the flow of current through the wire 30 and the cutout coil 40' to the ground, the contact 40''' of the movable contact 40" of the relay 40 contacts the other of the pair of contact members 40$^{iv}$ of the cutout relay 40, resulting in the flow of current through the wires 38' and 44 and the coil of solenoid 42 to the ground, thereby causing the solenoid valve to open against the pressure of its spring 42' and thus allowing the hydraulic cylinder 46 to receive hydraulic fluid from the hydraulic fluid pump 2 drawn from a reservoir 3, both the pump and the reservoir being normally associated with the vehicle. Said hydraulic fluid will enter the cylinder 46 through a flexible hose 48 running from the pump to the valve 42 since at the same time current flows through wire 38 to the relay 40, current also flows through the wires 38 and 39 to the hydraulic pump motor 1, thus starting the hydraulic pump 2 at the same instant that solenoid valve 42 is opened. It is to be noted that the grounded frame of the cutout relay 40 carrying the coil 40' is insulatingly connected to spring 40$^v$ which normally holds the movable contact member 40" separated from the contact member 40$^{iv}$.

The hydraulic cylinder 46 is of the type wherein when hydraulic pressure is applied thereto, the piston 47 therein is moved longitudinally of the cylinder so as to apply pressure to and cause movement of the parking brake cross lever 50 against the effort of the parking brake cross lever retracting springs 52 and 54 connected between the cross lever 50 and the cylinder 46, as shown in Figure 1, to move cables 56 and 58 and the cylinder to the position of Figure 1.

The piston rod 60 of the hydraulic cylinder 46 is connected to the parking brake cross lever 50 by a universal type joint, generally indicated at 62 and shown in detail in Figure 3. The free end of the piston rod 60 (as shown in Figure 3) is formed as a ball 64 and received in a complementally formed socket 66 in the lever 50. A U-shaped bracket 68 is in surrounding relation to the lever 50 and is pivotally secured to the piston rod 60 adjacent the ends of the opposite legs thereof by the joint 62.

Thus, it will be seen that the socket 66 is carried between the opposite legs of the bracket 68 whereby the free action of the piston within the hydraulic cylinder 46 may have its movement imparted to the parking brake cross lever 50.

As the cylinder piston 47 is moved by hydraulic action to apply the parking brakes against the effort of the springs 52 and 54, the parking brake lever will be moved to the left to the position shown in Figure 1 and the engagement of the braking surfaces will hold the piston against further movement in that direction. Since the hydraulic fluid will continue to act against the piston 47, the cylinder 46 will be forced to move in an opposite direction toward the compensator cylinder 28.

As the cylinder 46 is thus actuated, pressure is also applied through the cylinder rod 70 to the rod 72 connected thereto through an antifriction, universal type joint 74 attached to the bifurcated end 73 of the rod 72.

The rod 72 extends through a suitably formed opening 76 in the closed end 76' of the compensator cylinder 28 adjacent to the hydraulic cylinder 46. A compensator piston 78, of which the rod 72 is formed as an integral part, is disposed within the compensator cylinder for sliding movement longitudinally thereof.

The compensator piston 78 is of hollow tubular construction having one end thereof, remote from the end from which the rod 72 projects, open so as to receive within the interior diameter of the piston 78, a compensator spring 80, of greater strength than the combined strength of the springs 52 and 54, which is seated against the end of wall 82 of the piston 78 while the other end of the spring 80 is seated against the opposite end wall 84 of the cylinder 28.

Thus, as the piston rod 72 is moved by action of the hydraulic cylinder 46 in a direction toward the end wall 84 of the compensator cylinder remote from the hydraulic cylinder 46, the spring 80 will be compressed. An upstanding lug 86 is formed on a sliding plate 88 resting on the top surface of the compensator cylinder 28 and within the housing 26 so as to be capable of movement longitudinally thereof. The piston 78 is provided with an upstanding, integrally formed pin 90 projecting upwardly through the plate 88 through a suitably formed opening therein so that movement of the piston 78 will be transmitted to the slide plate 88 so as to cause movement thereof longitudinally of the switch housing 26. As the plate 88 is moved away from the resilient contact arm 92 of the terminal 94, which is the end terminal of the three terminals 94, 95 and 96 formed at the other end of the switch housing 26 remote from the end carrying the terminals 21, 22, and 23, so as to engage the resilient contact arm 98, the resilient contact arm 98 will be caused to engage the projecting end of the contact arm 36, through the insulating button 97 carried on the free end of the contact arm 98. Thus, the contact 32 will move away from engagement with the contact 30 and thereby break the circuit through the wire 38, relay coil 40' of the relay 40, contact member 40$^{iv}$, contact 40''' of the movable contact 40'', wire 44 and solenoid valve 42, and the wire 39 to the hydraulic pump motor. This will cause discontinuation of the action of the hydraulic pump and the spring 42' of the solenoid valve 42 will now close the valve to maintain pressure in the cylinder 46 to thus maintain the parking brakes in their applied condition.

Thus, the ground lug 86 on the sliding plate 88 will be electrically connected with the terminal 21 and form the ground through wire 100 for a red signal lamp 102, preferably mounted in the driver's compartment of the vehicle so as to be visible to the operator therof, to indicate that the parking brakes are on. As will be noted from Figure 2, the lamp 102 is connected by a wire 104 to the ignition switch 106 which is operatively connected to the battery 16 in the usual manner. Thus, when the ignition switch is turned to its "on" position, the circuit to the lamp 102 will be completed and will show by its color that the parking brake is on.

In releasing the parking brake, the button on the control switch 10 is moved to a lower position so that contact is made between the terminals 12 and 13 and current flows through wire 108 to the middle terminal 95 of the terminals 94, 95 and 96, which are electrically insulated one from the other, and the terminal 95 is electrically connected to the bracket 110 of electrically conductive material, which carries thereon a contact point 112 which will be in engagement with the resilient contact arm 116 electrically connected to the terminal 96 so that the current will flow through the terminal 96 and through a wire 118 to connect with the wire 44 and actuate and open the hydraulic cylinder solenoid valve 42. This will permit the hydraulic fluid to flow back into the hydraulic pump reservoir 3 normally associated with the hydraulic pump of the vehicle. This will relieve the hydraulic pressure in the piston 47 and allow the springs 52 and 54 to return the cross lever 50 to and cause the cables 56 and 58 to release the parking brake.

Piston 78 is moved in its rectilinear path away from the end wall 84 of the compensator cylinder. Movement of the piston 78 will cause the plate 88 to slide longitudinally of the compensator switch housing 26 in a direction away from the resilient contact arm 98 and toward the resilient contact arm 92. Thus, the lug 86 will engage the resilient contact arm 92 causing the insulating button 93 thereon to contact the projecting end of the resilient contact arm 116 to move the contact point 114 away from the contact point 112, thereby breaking the circuit through wire 118 and wire 44 to the solenoid valve 42. This will cause the spring 42' of solenoid valve 42 to close and maintain the parking brakes in their "off" position. Thus, also, the ground lug 86 will be electrically connected with the terminal 94 through the contact arm 92 which will form a ground for the green signal lamp 120 mounted adjacent the red signal lamp 102, which lamp is also electrically connected into the wire 104 leading to the ignition switch 106. Therefore, as the ignition switch 106 is moved to its "on" position, the circuit to the green signal lamp 120 will be completed and the lamp will be illuminated so as to indicate to the operator of the vehicle that the parking brake is off.

As the lug 86 moves away from the resilient contact arm 98, the contact between the arm 98 and the resilient contact arm 36 is broken while the contact points 30 and 32 will again be in engagement so as to have the parking brake control system in position to again be energized to apply the parking brakes upon actuation of the control switch 10 in the manner hereinbefore indicated.

As shown in Figure 4, the slide plate 88 is provided with a pair of longitudinally extending guide rails 122 disposed along opposite longitudinal edges thereof and contacting the adjacent inner surfaces of the switch housing 26 so as to guide the plate 88 within the switch housing. The guide rails 122 are preferably formed of angle stock of L-shape.

Also, it will be noted that the compensator cylinder wall is provided with an elongated slot 29 in the top surface thereof which is in communication with the interior of the switch housing 26 and which forms a guide slot in which the pin 90 may ride during its rectilinear movement longitudinally of the compensator cylinder.

When the solenoid valve 42 is energized by moving the button on the control switch 10 to the lower position, the circuit to the hydraulic pump motor through the wires 38 and 39 is broken by operation of the cutout relay 40, thus preventing the motor from starting.

In the event of leakage in the hydraulic cylinder 46, the compensator spring 80 will push the piston 78 forward, that is toward the end wall 82 of the piston, so that the contact points 30 and 32 will again become electrically engaged and the circuit to the hydraulic pump and solenoid valve 42 is completed and the brakes will be applied in the manner hereinbefore set forth, so that such operation will occur if the switch contacs 10, 11, 12 are connected. Therefore, though a leakage of fluid does occur in the cylinder 46, the parking brakes will be continuously applied when the system is so actuated.

While there is shown and described the preferred embodiment of the invention, it is to be understood that the structure is susceptible to change and modification within the practicability of the invention and therefore should be limited only by the scope of the claims appended hereto.

What is claimed is:

1. In a vehicle, the combination with normally released parking brakes on said vehicle, of a parking brake control system comprising a hydraulic pump, a motor mechanically connected to said pump and having one end of its windings grounded, a hydraulic cylinder operatively connected between said pump and said parking brakes, a solenoid valve on said cylinder and normally moved to closed position upon deenergization of the solenoid and movable into open position upon energization of the solenoid, a control switch including a pair of stationary contacts and a movable contactor shiftable to contact with either of said stationary contacts, a source of currnet electrically connected to said movable contactor, a compensator closed ended cylinder arranged on one side of said hydraulic cylinder so that one of the closed ends is adjacent said hydraulic cylinder and the other of the closed ends is remote from said hydraulic cylinder, a piston mounted within said compensator cylinder for movement between the closed ends of the latter, said piston being normally in the position adjacent said one closed end of said compensator cylinder, a compensator switch housing carried by said compensator cylinder, a cut-out relay adjacent said switch housing and including an operating coil having one of its ends grounded and a fixed contact member and a contact member movable into and out of contact therewith, a set of terminals adjacent the closed end of said housing remote from said hydraulic cylinder, another set of terminals adjacent the closed end of said housing adjacent said hydraulic cylinder, one of the terminals of the set adjacent said closed end of said housing remote from said hydraulic cylinder being electrically connected to one of said control stationary contacts and another one of the terminals of the last-named set being electrically connected to the other end of the windings of said motor and to the movable contact member and the other end of the coil of said cutout relay, the fixed contact member of said cutout relay being electrically connected to one end of the coil of said solenoid valve, one of the terminals of the set adjacent said closed end of said housing adjacent said hydraulic cylinder being electrically connected to the other of said control stationary contacts and another one of the terminals of the last-named set being electrically connected to the said end of the coil of said solenoid valve, the other end of the coil of the solenoid valve being grounded, means disposed within said compensator housing and operatively connected for movement with said compensator piston, said movable contactor of said control switch upon being shifted to contacting engagement with said one control stationary contact causing said one terminal of said set of terminals adjacent the closed end of said compensator cylinder remote from said hydraulic cylinder to be energized and movement of said solenoid valve to the open position together with actuation of said motor to admit hydraulic fluid from the pump to said hydraulic cylinder and initiation of movement of said piston from the closed end of said compensator cylinder adjacent to said hydraulic cylinder toward the closed end remote from said hydraulic cylinder, said piston upon completion of the movement to the closed end of said compensator cylinder remote from said hydraulic cylinder causing said one terminal of said set of terminals to be deenergized and close the valve and shut off the motor.

2. The structure according to claim 1 wherein said means includes a slide plate having an upstanding lug thereon normally engageable when the vehicle brakes are in unset position with said one and another of said set of terminals adjacent the closed end of said compensator cylinder adjacent said hydraulic cylinder and upon completion of movement of said piston from the closed end of said compensator cylinder adjacent said hydraulic cylinder to the closed end of said compensator cylinder remote from said hydraulic cylinder causing electrical deenergization of said another of said sets of terminals adjacent the closed end of said compensator cylinder remote from said hydraulic cylinder and set the brakes of said vehicle.

References Cited in the file of this patent

UNITED STATES PATENTS

| | | |
|---|---|---|
| 2,190,120 | Kohler | Feb. 13, 1940 |
| 2,374,909 | Williams | May 1, 1945 |